C. MAHAN, Sr.
Clod-Crusher.
No. { 2,620, 33,624. }
Patented Oct. 29, 1861.
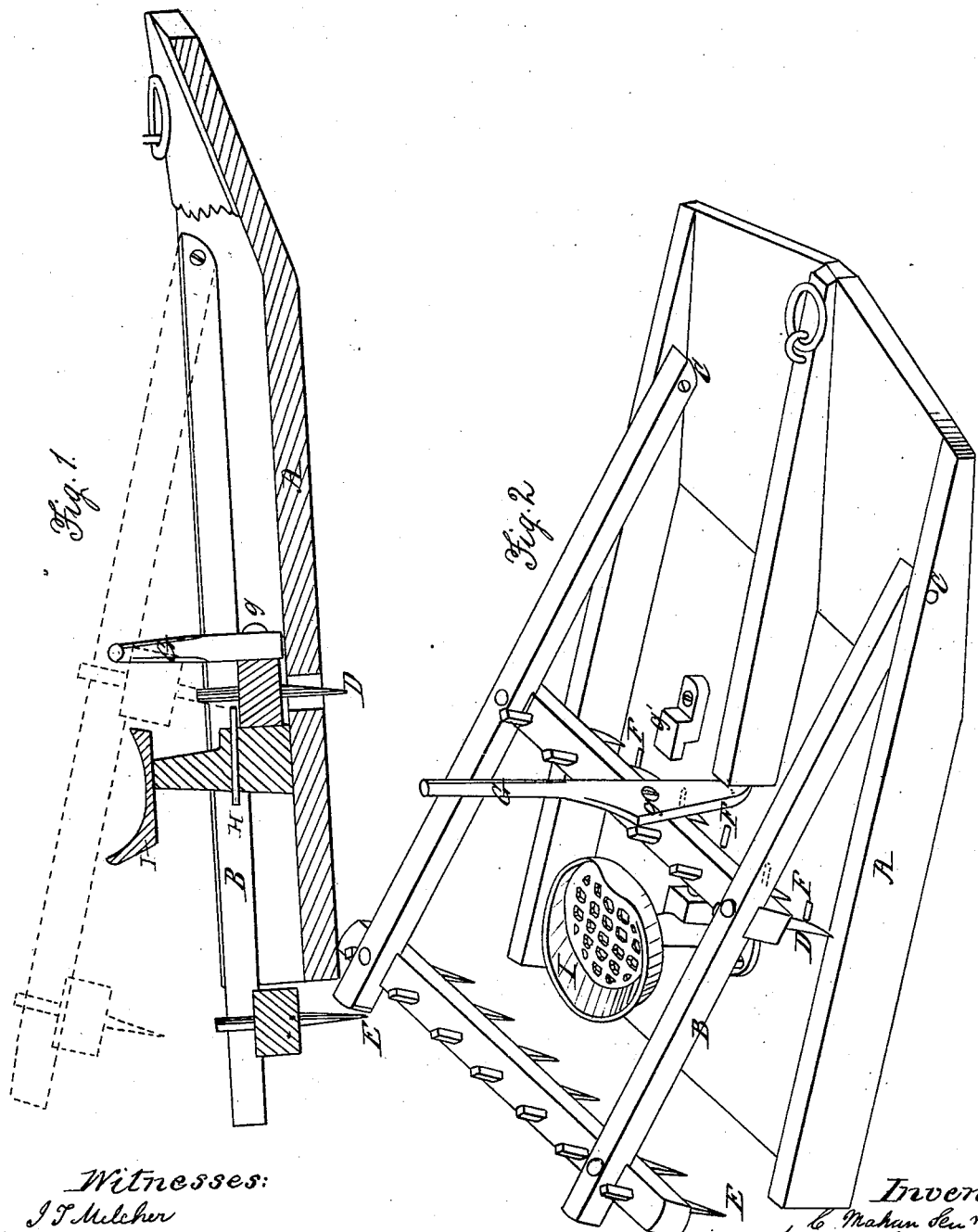

UNITED STATES PATENT OFFICE.

CHARLES MAHAN, SR., OF JAMESTOWN, OHIO, ASSIGNOR TO HIMSELF AND ALFRED JOHNSON, OF SAME PLACE.

IMPROVED CLOD-CRUSHER.

Specification forming part of Letters Patent No. 33,624, dated October 29, 1861.

*To all whom it may concern:*

Be it known that I, CHARLES MAHAN, Sr., of Jamestown, Greene county, Ohio, have invented a new and useful Improvement in Clod-Crushers; and I do hereby declare the following to be a full, clear, and exact description of the nature, construction, and operation thereof, reference being had to the annexed drawings, making part of this specification.

My invention is intended to effect a simultaneous pulverizing and cleaving of each individual clod; and it consists in an arrangement of harrow-teeth made to project through the sole of the drag, and to be withdrawn by and at the discretion of the operator for riddance of trash or otherwise.

Figure 1 is a longitudinal section of a machine embodying my improvement. Fig. 2 is a perspective view of the same.

A may represent a drag of any approved form. B is a harrow hinged by its front portion, at C, to the drag. In the form selected for illustration the harrow has two rows of teeth, D and E, the front row of teeth, D, having knife-edges, and when in use (see Fig. 1) passing through slots F in the drag-floor, and projecting about three inches through and beyond the sole of the drag. The rear teeth, E, may be of customary harrow form, and may either pass through the drag or just behind its rear edge, as represented. They should penetrate the ground about one inch deeper than the knives D, with which they should alternate.

G is a lever pivoted to the harrow at *g*.

*g'* is a catch, which, when the lever G is depressed, holds the heel of said lever, and thus acts as a fulcrum which aids the driver's foot in holding the lever down. The lever G may be employed either to hold the harrow down or, at any instant, to elevate the entire harrow to rid it of trash or to avoid roots, rocks, or stumps, or to traverse a meadow or a wagon-track. The harrow being elevated or detached altogether, the drag becomes a convenient sled for conveyance of fodder, fence-rails, &c.

H is a pin, by which the harrow may be held to its lowest or working position.

I is a seat for the driver.

Operation: The harrow being fastened down by pin H, or held down by the foot of the driver upon the lever G, and the implement being drawn forward, the ground becomes leveled by the sole of the drag, and is held firmly for the action of the knives D upon the clods, which, being thereby cut to pieces and broken, are further pressed down and pulverized by the rear portion of the drag, and receive a final and effectual comminution by the combined action of the drag and the rear teeth, E.

It is found that a drag and harrow thus combined in one, and acting in conjunction and simultaneously on the same clod, operate to pulverize the soil more thoroughly than they can be made to do separately, whether such separate action is performed by a harrow attached to and following after the drag or as a distinct and separate operation in the usual way. The comparatively short time required for the operation also enables the husbandman to perform the entire work while the ground is mellow.

I claim as new and of my invention—

The arrangement of drag A, harrow B C D E, lever G *g*, apertures F, and catches *g'* and H, or equivalent devices, for simultaneous division and pulverization of the clods, or for momentary suspension of the harrow action, substantially as set forth.

In testimony of which invention I hereunto set my hand.

CHARLES MAHAN, SR.

Witnesses:
GEO. H. KNIGHT,
JOHN DODGSON.